United States Patent [19]

Taylor

[11] Patent Number: 4,626,311
[45] Date of Patent: Dec. 2, 1986

[54] CLOTH PRODUCT HAVING AN ANTITHEFT DEVICE AND METHOD OF MAKING SAME

[75] Inventor: Jeffrey L. Taylor, Cincinnati, Ohio

[73] Assignee: Standard Textile Co., Inc., Cincinnati, Ohio

[21] Appl. No.: 582,788

[22] Filed: Feb. 23, 1984

[51] Int. Cl.[4] ............................................. B32B 31/20
[52] U.S. Cl. ................... 156/308.2; 2/115; 2/260; 2/260.1; 156/213; 156/309.6; 340/572; 428/68; 428/76
[58] Field of Search .............. 428/68, 76, 900; 2/115, 2/260, 260.1; 116/200, 204, 306, 307; 340/572; 156/213, 309.6, 308.2

[56] References Cited

U.S. PATENT DOCUMENTS 4,103,295  7/1978  Doerre ................................. 340/572
4,342,904  8/1982  Onsager ............................... 340/572

Primary Examiner—James J. Bell
Attorney, Agent, or Firm—Kinney & Schenk

[57] ABSTRACT

A launderable cloth product having an antitheft device attached thereto, antitheft device for such product, and method of making each are provided in which the device is capable of interrupting magnetic a sensing field upon passing the product with its attached device through the field wherein the device comprises an inner member made of a magnetically detectable material and a dual-purpose cover member serving to encapsulate the inner member while serving to attach the device to a particular part of the product by fusion and the fusion requires substantial damage to the part in order to remove the device from the product.

9 Claims, 9 Drawing Figures

U.S. Patent Dec. 2, 1986 Sheet 1 of 2 4,626,311
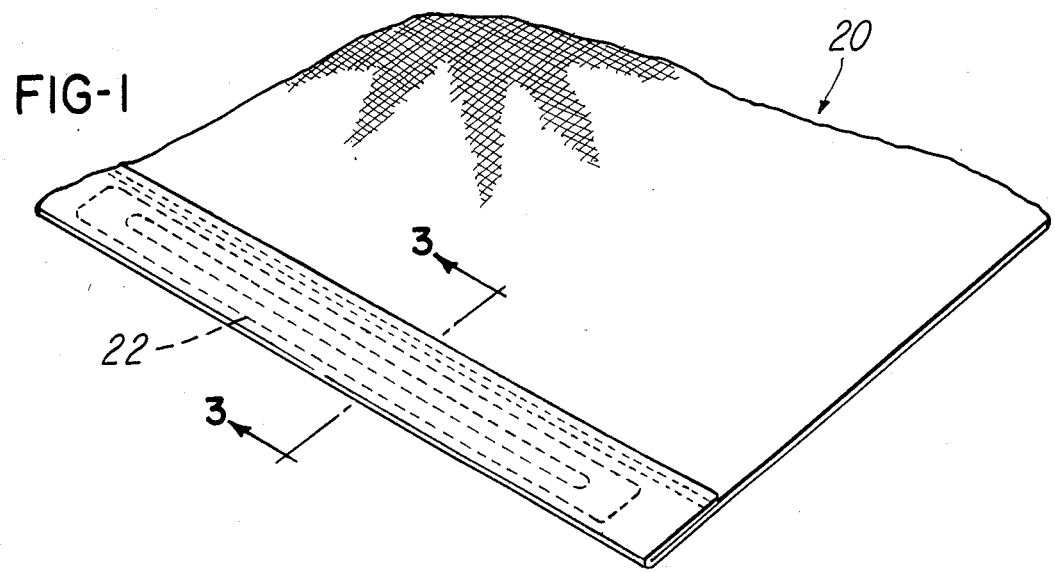
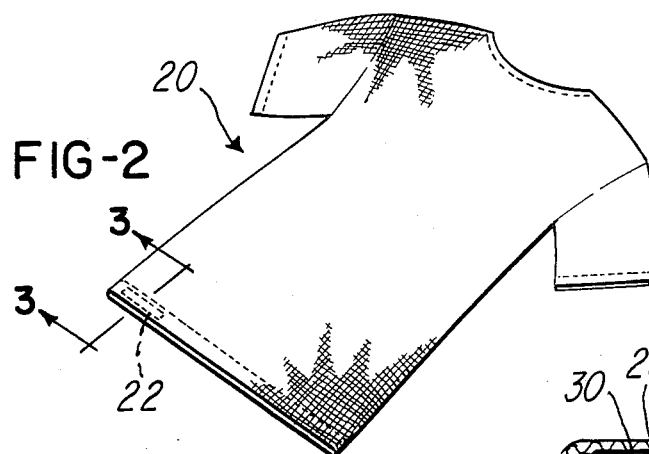
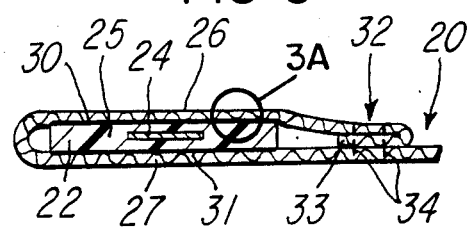
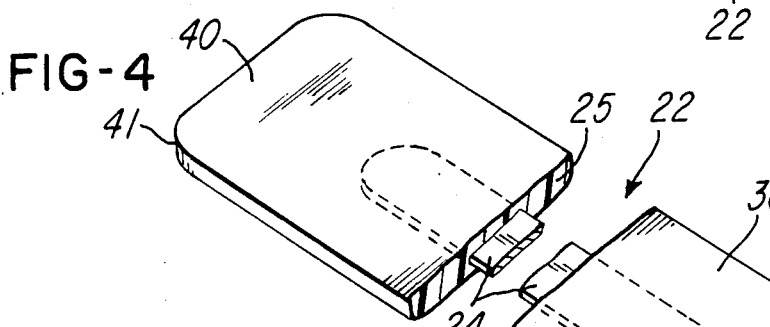
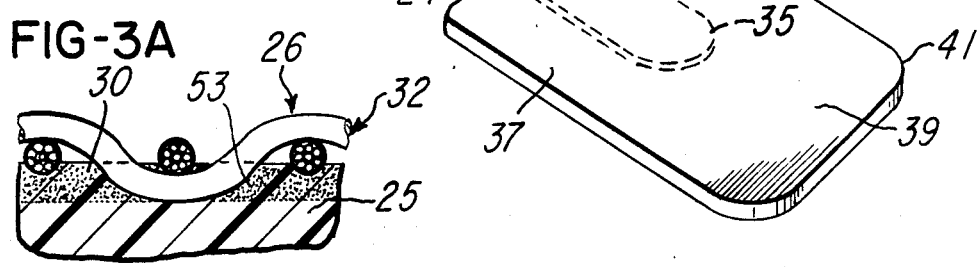

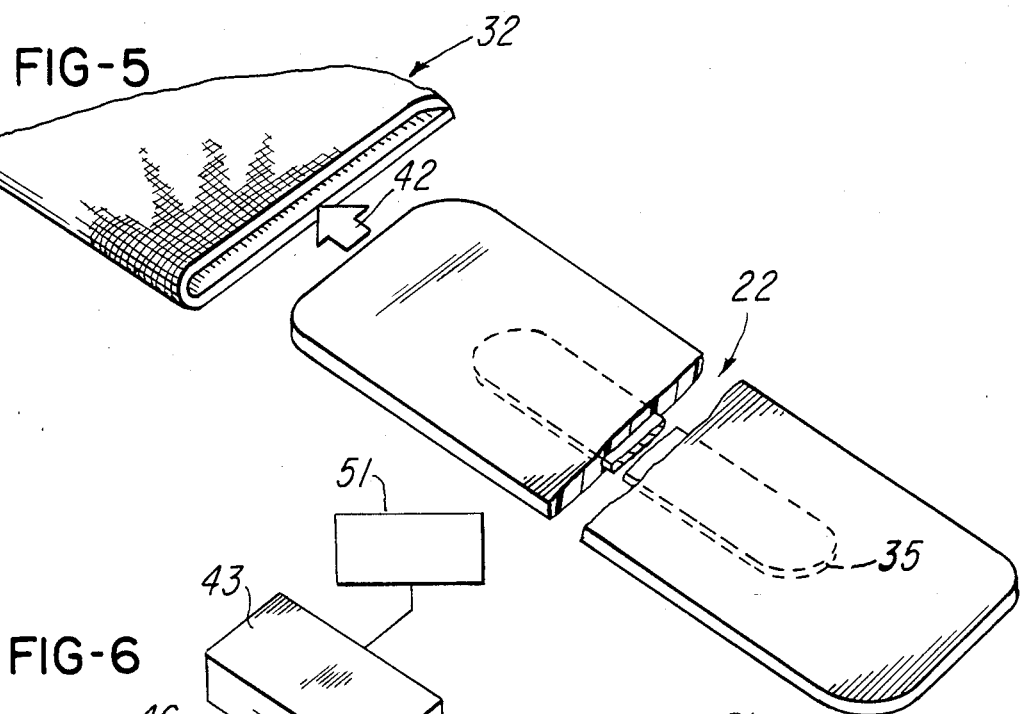
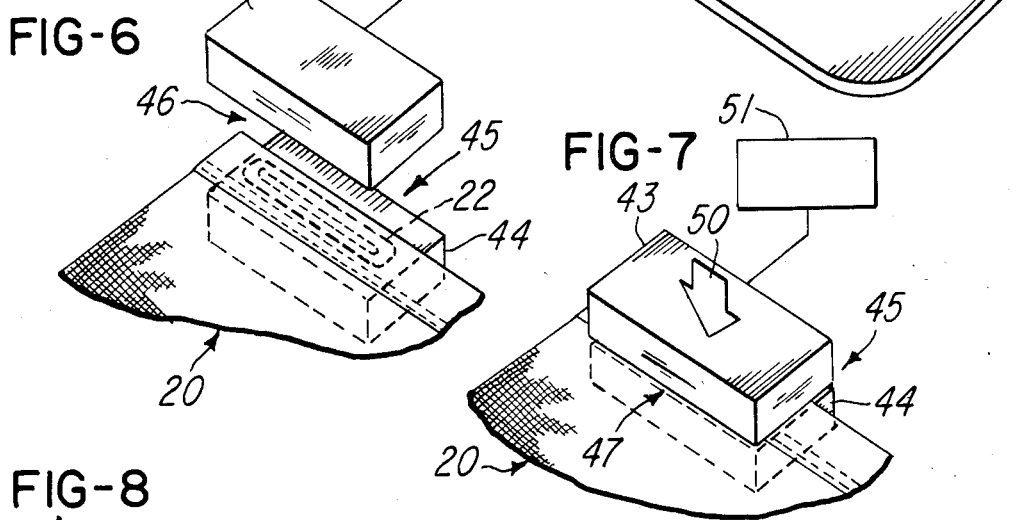
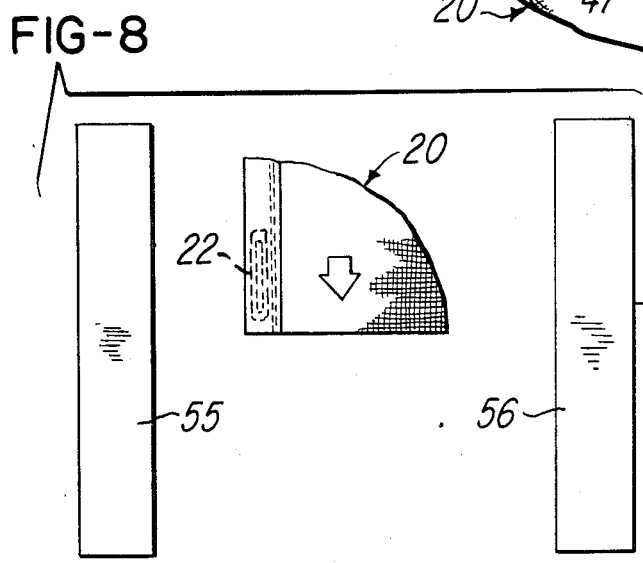

CLOTH PRODUCT HAVING AN ANTITHEFT DEVICE AND METHOD OF MAKING SAME

BACKGROUND OF THE INVENTION

1. Field of the Invention

This invention relates to a cloth product having an antitheft device attached thereto and method of making same, and in particular to such a cloth product which is launderable and utilized in hospitals, nursing homes, and similar facilities.

2. Prior Art Statement

A serious problem in hospitals, nursing homes and similar health care facilities is the theft of bedroom and bathroom linens as well as thefts of items of wearing apparel such as gowns, scrub suits, shirts, pajamas, and the like of the types worn on the premises by patients and health care professionals such as doctors, nurses, and hospital assistants.

In an effort to solve these thefts, various techniques have been employed heretofore including the attachment of metal members to the various cloth products by various means. Each cloth product thus provided with a metal member is then capable of being detected once such product is moved through a magnetic field.

However, it is a simple matter to remove some of the previously proposed metal devices from their associated cloth products without damage thereto whereby it would then be easier for a theif to steal the product without being detected.

The cloth products which have been candidates for theft are launderable cloth products and in the past metal members have been attached to such products for antitheft purposes. However, the previously used metal members have been unsatisfactory because they tend to corrode or are attacked by the chemicals used in the laundry water during laundering of the cloth product. The net result is an unsightly staining or spotting of the cloth product. Further, in some instances the chemicals used in the laundry water produce a chemical reaction with the metal member causing deterioration thereof and often premature failure of the cloth product adjoining such metal member. In other instances where a metal member has been used in a cloth product of the character mentioned and wherein such metal member is disposed within a hem thereof, there has been a tendency for the metal member to move around or pierce the fabric causing premature failure of the portions of the cloth product which define the hem.

The net result has been that previous launderable cloth products having antitheft metal members attached thereto have only been capable of being laundered as few as about two dozen times and thereafter the antitheft device was either ineffective due to deterioration therof or the cloth product was so badly stained or spotted due to the action of laundry chemicals on the metal member that it was necessary to discard the cloth product prematurely and thereby incur a substantial added expense in the operation of health care facility, or the like.

Accordingly, it is apparent that previous cloth products of the character mentioned have deficiencies.

SUMMARY OF THE INVENTION

This invention provides a cloth product having an improved antitheft device attached thereto which overcomes the above-mentioned deficiencies and wherein the device is capable of interrupting a magnetic sensing field upon passing the product with its attaches device through such field.

In accordance with one embodiment of this invention the improved cloth product utilizes said device which comprises an inner member made of a magnetically detectable material and a dual-purpose cover member made of a thermoplastic material and serving to encapsulate the inner member while serving to attach the device to a particular part of the product by fusion. The fusion requires substantial damage to such particular part in order to remove the device from the product whereby theft of the cloth product which utilizes such device is deterred.

Accordingly, it is an object of this invention to provide an improved launderable cloth product of the character mentioned which is particularly usable in a hospital, nursing home, health care facility, and the like.

Another object of this invention is to provide an improved method of attaching this device to a cloth product.

Another object of this invention is to provide an improved antitheft device for a cloth product of the character mentioned.

Another object of this invention is to provide an improved method of making an antitheft device for such a cloth product.

Other features, objects, uses, and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention, in which FIG. 1 is an isometric view of a corner portion of an exemplary launderable cloth product of this invention having an antitheft device attached thereto within a hem thereof;

FIG. 2 is an isometric view of a launderable cloth product in the form of an item of wearing apparel having an antitheft device thereto also in a hem thereof;

FIG. 3 is an enlarged fragmentary cross-sectional view as taken on the line 3—3 of either FIG. 1 or FIG. 2 though not drawn to scale to highlight the invention;

FIG. 3A is a greatly enlarged view of the area generally within the circle shown in FIG. 3;

FIG. 4 is an isometric view (not drawn to scale) with the central part broken away and parts in cross section of the exemplary antitheft device of FIGS. 1-3;

FIG. 5 is a fragmentary isometric view showing the manner in which the antitheft device of FIG. 4 may be disposed within a hem of the cloth product of either FIG. 1 or FIG. 2;

FIG. 6 illustrates disposing the cloth product with the antitheft device within its hem between cooperating relatively movable platens in an open position to enable application of heat and pressure thereagainst for a controlled time period;

FIG. 7 is a view similar to FIG. 6 illustrating the platens in a closed position; and FIG. 8 is a schematic presentation illustrating the manner in which a cloth product of this invention is detected upon being moved between sensing panels.

DETAILED DESCRIPTION

Reference is now made to the drawings and in particular to FIG. 1 which illustrates one exemplary embodiment of a cloth product of this invention in the form of a portion of a launderable bed sheet which is designated generally by the reference numeral 20 and to FIG. 2 which illustrates another exemplary embodiment of a cloth product of this invention in the form of a launderable item of wearing apparel, i.e., the shirt portion of a scrub suit which is also designated generally by the reference numeral 20 for ease of description. The cloth product 20 of FIG. 1 and of FIG. 2 has an antitheft device 22 of this invention provided as a portion thereof and attached thereto in a manner to be subsequently described. The device 22 is capable of interrupting a sensing field upon passing the product 20 with its attached device through such field.

Although the cloth product illustrated in FIG. 1 is in form of a launderable bed sheet and in FIG. 2 is in the form of a launderable scrub shirt, it will be appreciated that any cloth product may have the antitheft device 22, in essence, permanently attached thereto as will be described herein. However, the preferred application of the antitheft device 22 is bedroom and bathroom linens; and items of wearing apparel, such as, patient gowns, scrub suits, surgical gowns, and the like utilized in hospitals, nursing homes, health care facilities, and the like.

As will be apparent from FIGS. 3 and 4 the device 22 comprises an inner member 24 and a dual-purpose cover member 25 serving to encapsulate the inner member while serving to attach the device to a particular part of the product 20 by fusion. The cover member 25 serves to attach the device 22 to at least one part of the sheet 20 and in the illustration of FIG. 3 serves to attach such device to two parts 26 and 27 of the sheet.

The attachment by fusion is such that it would require substantial damage to parts 26 and 27 in order to remove the device 22 from the product 20. The damage would be such that it could be easily detected whereby it would be apparent that the device had been removed from the product 20 and therefore render the product unserviceable.

The inner member of device 22 is in the form of an elongate strip 24 and such strip is made of a magnetically detectable material whereby the device 22 with its strip 24 is particularly adapted to be sensed in a sensing field in the form of a magnetic field and the utilization of such a magnetic field for antitheft purposes is well known in the art.

The cover member 25 is preferably made of a suitable thermoplastic material and such thermoplastic material serves to encapsulate the strip in a fluid-tight manner and for a purpose to be subsequently described. In the illustration of FIG. 3 the thermoplastic cover member 25 has a surface portion 30 fused to the part 26 and a surface portion 31 fused to the part 27 of the product 20 whereby the device 22 is attached to the product 20.

As mentioned earlier, the fusion requires substantial damage to both parts 26 and 27 of the product 20 in order to remove the device 22 therefrom. Indeed, such fusion is such that it would require substantial destruction of parts 26 and 27 and such destruction because of its easy detectability by visual inspection would serve to discourage a potential thief. In addition, it will be appreciated that the device 22 is comparatively readily attached in the cloth product. While only one device 22 is necessary, more than one device 22 may be attached to each cloth product at diametrically spaced locations. Knowing that a plurality of devices 22 may be attached, a thief would be further discouraged from stealing the cloth article.

The device 22 may be attached to the cloth product at any suitable location. In the case of washable linen item and wearing apparel such as a scrub suits, and the like, for institutional use, the device 22 is preferably installed within a hem 32 of such product (FIGS. 3 and 5). The hem 32 may be of the usual known type with parts 26 and 27, previously described, defining parts of the hem and with such hem having an inturned edge 33 and the usual stitching 34.

Referring now to FIG. 4 of the drawings it is seen that the inner member or elongate strip 24 is of substantially rectangular outline and has smooth rounded corners 35 with a typical one being so designated. The rounded corners 35 substantially reduce any tendency of the inner member 24 to pierce through the thermoplastic cover member 25.

The device 22 may be suitably dimensioned for use in its intended application; however, when such device is used in a launderable cloth product 20 of the type disclosed in FIGS. 1 and 2 the inner member 24 is several inches in length, a small fraction of an inch in width, and several mils thick. In particular, in one example of the invention the inner member was $3\frac{1}{2}$ inches long, $\frac{1}{8}$ inch wide, and about 0.006 inch or 6 mils thick. As a general rule, the thickness is such that member 24 is readily flexible yet it is not easily broken. Further, it will be appreciated that the size of the strip 24 is such that it will interrupt a sensing field and enable easy detection thereof and hence of the product to which it is attached.

The cover member 25 of the device 22 may be of any suitable thickness and is also of comparatively small size. Preferably the cover member has a thickness generally of the order of 5 mils (0.005 inch) and it will be seen that such cover member completely encapsulates the strip 24; and, such encapsulation is such that cover member 25 is defined as a single solid piece of thermoplastic material which surrounds the strip 24. Accordingly, as shown in FIG. 4, the solid piece member 25 has integral opposed sides 36 and 37 and integral opposed ends 39 and 40. As illustrated in FIG. 4, the cover member 25 may have rounded corners 41.

It will also be noted that certain size relationships of product 20, member 24, and portions 36–37 and 39–40 of member 25 have been shown in FIGS. 3–5 and other Figs. of the drawings. These size relationships may or may not be accurate. Basically, the size relationships have been exaggerated in the drawings to highlight the invention.

Having described the exemplary cloth product 20 with its antitheft device 22 attached thereto, the description will now proceed with certain steps of the method of making such cloth product which has such antitheft device. In particular, the method comprises the steps of providing the inner member 24, encapsulating the inner member with the dual-purpose cover member 25 to define device 22, and attaching the device 22 to the product 20 by fusion of a portion of the cover member to a particular part of the product. The fusion is such that it requires substantial damage to the part in order to remove the device 22 from the product 20.

In carrying out the method the attaching by fusion comprises urging a portion of the cover member 25 against at least a part of the product 20 at a controlled pressure while heating such part to a controlled temperature. This attaching by fusion in this example is comparatively simple because, as shown in FIG. 5, the product 20 has the hem 32 of the usual type. The method comprises disposing the device 22 within the hem 32 as shown schematically by the arrow 42 in FIG. 5.

After disposal of the device 22 within the hem 32, the portion of such hem with the device 22 therewithin is placed between a pair of relatively movable platens 43 and 44 of a heat sealing apparatus 45 and such disposal is illustrated at 46 in FIG. 6. The method comprises the further step of urging, as shown at 47 in FIG. 7, opposed parts 26 and 27 of the product 20 which define the hem, against the device 22 at a controlled pressure while simultaneously heating the opposed parts 26 and 27 to a controlled temperature to thereby attach by fusion the surface portion 30 of the device 22 to part 26 and surface portion 31 of the device 22 to part 27. The urging at a controlled pressure is achieved by a suitable urging means 50 indicated schematically by an arrow in FIG. 7; and, in this example the platen 44 is stationary while the platen 43 is movable at a controlled force or pressure toward and away from platen 44 by means 50.

Although any suitable pressure may be utilized, a total pressure or force generally of the order of 80 pounds per square inch is preferred. Similarly, a temperature generally of the order of 400° F. is also preferred. The actual pressure range may be between roughly 75 and 85 pounds per square inch while the temperature range may be between roughly 375° and 410° F. Further, the platens 43 and 44 may be heated by any suitable means known in the art.

Thus, it will be appreciated that the fusion of device 22 in position is achieved by relatively moving the platens 43–44 toward each other and sandwiching the hem 32 with device 22 between parts 26 and 27 of the hem. The platens 43–44 are heated to the 400° F. temperature and the pressure applied by the urging means 50 is generally of the order of 80 pounds per square inch. The above-mentioned temperature and pressure are suitably controlled and applied for a time period which will vary depending upon the thickness of parts (such as parts 26 and 27) of the product. However, in the instance of cloth products such as linen products for bedrooms or bathrooms or items of wearing apparel of the type described herein the above-mentioned temperature and pressure are applied simultaneously for a time period ranging between 2 and 6 seconds. For a bed sheet, 3 seconds has been adequate in a previous application.

It will also be appreciated that the movement of platen 43, temperature of platens 43–44, and pressure applied by urging means 50 are all controlled by a control device 51 which is indicated schematically by a rectangular outline in FIGS. 6 and 7. The device 51 is suitably connected to heating means, pressure control means, timing means, and associated components all of suitable types known in the art to provide the controlled heat, pressure, and time for fusing parts 26 and 27 to portions 30 and 31 respectively of the cover member 25.

The thermoplastic material defining the cover member 25 may be any suitable thermoplastic material known in the art and preferably such thermoplastic material is generally of the order of 0.005 inches, i.e., 5 mils thick. Further, upon encapsulating the inner member 24 within cover member 25 a fluid-tight seal is provided about the entire periphery of the inner metallic member 24. This fluid-tight seal enables the cloth product 20 to be laundered in the usual laundering cycle therfor and while using the usual chemicals during laundering yet the magnetically detectable inner member 24 is totally isolated.

The isolation of the inner member 24 and attachment of device 22 in position by fusion enables laundering of product 20 in excess of fifty laundering cycles, which is over twice the number of cycles possible with cloth products using prior art detectable devices. Stated otherwise, the cloth product 20 may be laundered over 50 cycles, which is approximately the major portion of its normal life, without concern for deterioration of device 22 or spotting or unsightly discoloration of parts of product 20 due to chemical action caused by the laundry products used to wash the launderable cloth product 20.

During the sealing of the peripheral edges of the cover member 25 around the inner member 24 there is relatively little thinning of the 5 mil thick material. Further, the fusion of portions 30 and 31 of the cover member to parts 26 and 27 respectively results in a tenacious bond therebetween. This bond or fusion is designated by the reference numeral 53 in FIG. 3A and is shown by a stippled appearance.

It will be appreciated that the product 20 has inerstices between its threads (i.e., its warps and wefts in the case of a woven cloth product) and the thermoplastic material is partially moved within such interstices as shown in FIG. 3A to provide a tenacious heat fused bond between device 22 and parts 26 and 27.

In this disclosure both platens 43 and 44 have been described as being heated. However, it will be appreciated that only one platen, 43 or 44 need be heated and fusion on one side of the device 22 is sufficient to secure it to a product portion 26–27.

The inner member 24 comprising the device 22 may be made of any suitable material known in the art, however, preferably such inner member is made of material which is provided by 3M Company, Safety and Security Systems Division, 223-3N 3M Center, St. Paul, Minn. 55144. The device 22 is usable with detection system sensing panels or detectors 55 and 56, as shown in FIG. 8. This detection system also has suitable control means, power units, and associated components which are not shown; and an alarm 57 which is set off when a product 20 with device 22 thereon is passed between its panels 55–56. This detection system is sold by the 3M Company under the Registered Trademark Tattle Tape and the Model 1750 is especially applicable to detect products 20 in facilities mentioned herein.

As indicated earlier, the thermoplastic material 25 may be any suitable thermoplastic material known in the art and is preferably a thermoplastic polyester. The preferred material is sold by Speciality Adhesive Film Company, Inc. 6154 Oakhaven, Cincinnati, Ohio 45238 under the trade name SAF-O-BOND.

In this disclosure of the invention the device 22 is illustrated and described as having been disposed in a concealed manner within a hem of cloth product 20. However, it will be appreciated that such device need not necessarily be disposed within a hem but may be disposed in a readily visible unconcealed manner against any part of a cloth product and fused thereto in the manner described herein or such device 22 may be concealed in a seam or behind a panel of the cloth product. Nevertheless, regardless of where such device is attached to the cloth product it is basically fused thereto and would require substantial damage to such cloth product to remove same.

Terms such as sides, ends, and the like have been used in this disclosure to describe certain items as they are illustrated in the drawings. However, it is to be understood that these terms have been used for ease of description and should not be considered limiting in any way.

The device 22 also lends itself to installation on cloth products 20 which are presently not protected. In particular, it is a simple matter to install such device 22 within any open hem or against any surface and fuse it in position using the apparatus 45 previously described. In situations where a hem is not open and it is desired to install the device 22 therein, it is a simple matter to slit through one wall of the hem, insert the device therethrough and then fuse not only the device in position but the edges of the slit against the cover member 25.

While present exemplary embodiments of this invention, and methods of practicing the same, have been illustrated and described, it will be recognized that this invention may be otherwise variously embodied and practiced within the scope of the following claims.

What is claimed is:

1. In a method of making a cloth product having an antitheft device attached thereto, said method comprising the steps of, providing means attaching said device to a cloth product, providing means in said device capable of interrupting a magnetic sensing field upon passing said product with its attached device through said field, said step of providing means capable of interrupting said sensing field comprises providing an inner member made of a magnetically detectable material, the improvement in said method in which said step of providing means attaching said device to said cloth product comprises the steps of encapsulating said inner member with a dual-purpose cover member made of a thermoplastic material, said cover member having a surface portion, and permanently attaching said device to said product by fusion of substantially the entire area of said surface portion to a particular part of said product which has interstices therein, said fusion resulting in the thermoplastic material of said cover member being partially moved within said interstices to provide a tenacious bond between said part and said surface portion and thereby require substantial damage to said part in order to remove said device from said product.

2. A method as set forth in claim 1 in which said attaching by fusion comprises urging said portion of said cover member against said part at a controlled pressure while heating said part to a controlled temperature.

3. A method as set forth in claim 2 in which said pressure is generally of the order of 80 pounds per square inch total pressure, said temperature is generally of the order of 400° F., and said urging and heating steps are achieved simultaneously for a controlled time period ranging between two and six seconds.

4. A method as set forth in claim 2 in which said encapsulating step comprises providing only two components in the form of said sheet made of said thermoplastic material and said inner member, and heat sealing said sheet around said inner member.

5. A method as set forth in claim 4 in which said step of heat sealing said sheet comprises heat sealing said sheet having a thickness generally of the order of 5 mils.

6. A method as set forth in claim 5 in which said product has a folded portion, said device is disposed within said folded portion, and said attaching by fusion comprises attaching substantially the entire area of at least another surface portion of said cover member to another part of said product within said folded portion.

7. A method as set forth in claim 1 in which said product has a hem, said attaching by fusion comprises disposing said device within said hem and urging opposed parts of said product which define said hem against said device at a controlled pressure while simultaneously heating said opposed parts to a controlled temperature to thereby attach by fusion substantially the entire area of said portion of said cover member to one of said opposed parts and simultaneously attach by fusion substantially the entire area of another portion of said cover member to the other of said opposed parts.

8. A method as set forth in claim 7 in which said step of urging opposed parts at a controlled pressure comprises urging at a controlled pressure generally of the order of 80 pounds per square inch total pressure while simultaneously heating said opposed parts to a controlled temperature generally of the order of 400° F.

9. A method as set forth in claim 8 in which said urging and heating steps are achieved simultaneously for a time period ranging between 2 and 6 seconds and using a suitable apparatus having relatively movable platens.

* * * * *